(12) United States Patent
Johnson et al.

(10) Patent No.: US 9,355,776 B2
(45) Date of Patent: May 31, 2016

(54) CAPACITOR ASSEMBLIES FOR COUPLING RADIO FREQUENCY (RF) AND DIRECT CURRENT (DC) ENERGY TO ONE OR MORE COMMON ELECTRODES

(71) Applicant: APPLIED MATERIALS, INC., Santa Clara, CA (US)

(72) Inventors: Carl Johnson, Tracy, CA (US); Les Wojnowski, San Jose, CA (US); Lawrence A. Ringor, Mountain View, CA (US); Jeffrey Ludwig, San Jose, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 234 days.

(21) Appl. No.: 14/249,327

(22) Filed: Apr. 9, 2014

(65) Prior Publication Data

US 2015/0294790 A1    Oct. 15, 2015

(51) Int. Cl.
*H01G 2/24* (2006.01)
*H01G 2/22* (2006.01)
*H02N 13/00* (2006.01)
*H01G 4/28* (2006.01)

(52) U.S. Cl.
CPC ............... *H01G 2/22* (2013.01); *H02N 13/00* (2013.01); *H01G 4/28* (2013.01)

(58) Field of Classification Search
CPC ............. H01G 2/22; H01G 4/28; H01G 2/04; H02N 13/00; H01L 21/30; H01L 21/31; H01L 21/3065; H01L 21/00; H01L 21/205; H05H 1/46

See application file for complete search history.

(56) References Cited

U.S. PATENT DOCUMENTS

| 5,670,066 | A | 9/1997 | Barnes et al. |
| 6,280,584 | B1 * | 8/2001 | Kumar ................... H02N 13/00 118/666 |
| 6,431,112 | B1 * | 8/2002 | Sill ........................ H01J 37/321 118/723 E |
| 6,492,612 | B1 | 12/2002 | Taguchi et al. |
| 2002/0042204 | A1 | 4/2002 | Hayashi et al. |
| 2009/0236214 | A1 * | 9/2009 | Janakiraman ..... C23C 16/45565 204/164 |
| 2010/0136793 | A1 | 6/2010 | Chen et al. |
| 2012/0168081 | A1 * | 7/2012 | Son .......................... H01G 5/16 156/345.28 |

OTHER PUBLICATIONS

International Search Report and Written Opinion mailed Jun. 24, 2015 for PCT Application No. PCT/US2015/020501.

* cited by examiner

*Primary Examiner* — Son Le
(74) *Attorney, Agent, or Firm* — Moser Taboada; Alan Taboada (57) ABSTRACT

Embodiments of a capacitor assembly for coupling radio frequency (RF) and direct current (DC) power to an electrode and substrate support incorporating same are provided herein. In some embodiments, the capacitor assembly includes a first conductive plate to receive RF power from an RF power source, the first conductive plate including a central bore; at least one capacitor coupled to the first conductive plate and surrounding the central bore; and a second conductive plate electrically coupled to the first conductive plate via the at least one capacitor, the second conductive plate including an input tap to receive DC power from a DC power source and at least one output tap to couple the RF and DC power to an electrode.

20 Claims, 5 Drawing Sheets

CAPACITOR ASSEMBLIES FOR COUPLING RADIO FREQUENCY (RF) AND DIRECT CURRENT (DC) ENERGY TO ONE OR MORE COMMON ELECTRODES

FIELD

Embodiments of the present disclosure generally relate to substrate processing equipment.

BACKGROUND

Formation of microelectronic devices on substrates often requires multiple layers of thin films which are deposited in a deposition chamber, such as, for example, a physical vapor deposition (PVD) chamber, an atomic layer deposition (ALD) chamber, a chemical vapor deposition (CVD) chamber, etc. An electrostatic chuck is often used to electrostatically retain a substrate on a substrate support during the deposition process. Direct current (DC) power, from a DC power supply, is typically provided to an electrode in the chuck to electrostatically retain the substrate on the chuck.

In addition, radio frequency (RF) energy is also often supplied to an electrode in the substrate support to control the energy of incoming ions travelling toward the substrate In some cases, the DC and RF energy are provided to the same electrode. For example, high current DC power is delivered to one or more electrodes in the electrostatic chuck while isolating the RF power from the DC current. Vacuum-style capacitors have been used to address this issue. However, the inventors have noted that these capacitors are large (e.g., about 2-3 inches) and, therefore, use up valuable space. Furthermore, in order to meet increased power demands in an electrostatic chuck, even larger capacitors would be necessary, thereby further using up valuable space. Other conventional designs include in-line arrays of capacitors. However, the inventors believe that the in-line array is also inefficient because additional capacitors must be added to meet added power requirements of the electrostatic chuck.

Therefore, the inventors have provided embodiments of improved capacitor assemblies for coupling RF and DC energy to an electrode.

SUMMARY

Embodiments of capacitor assemblies for coupling radio frequency (RF) and direct current (DC) energy to an electrode and substrate supports incorporating the capacitor assembly are provided herein. In some embodiments, a capacitor assembly includes a first conductive plate to receive RF power from an RF power source, the first conductive plate including a central bore; at least one capacitor coupled to the first conductive plate and surrounding the central bore; and a second conductive plate electrically coupled to the first conductive plate via the at least one capacitor, the second conductive plate including an input tap to receive DC power from a DC power source and at least one output tap to couple the RF and DC power to an electrode.

In some embodiments, a capacitor assembly for coupling RF and DC power to an electrode includes a circular conductive plate to receive RF power from an RF power source, the circular conductive plate including a central bore; a plurality of capacitors coupled to the circular conductive plate and radially disposed about the central bore; and a second conductive plate electrically coupled to the circular conductive plate via the plurality of capacitors, the second conductive plate including an input tap to receive DC power from a DC power source and at least one output tap to couple the RF and DC power to an electrode.

In some embodiments, a substrate support assembly includes a substrate support including at least one chucking electrode; an direct current (DC) power source; a radio frequency (RF) power source; and at least one capacitor assembly electrically coupled to the at least one chucking electrode. The at least one capacitor assembly includes a first conductive plate to receive RF power from an RF power source, the first conductive plate including a central bore; at least one capacitor coupled to the first conductive plate and surrounding the central bore; and a second conductive plate electrically coupled to the first conductive plate via the at least one capacitor, the second conductive plate including an input tap to receive DC power from a DC power source and at least one output tap to couple the RF and DC power to an electrode.

Other and further embodiments of the present disclosure are described below.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of capacitor assemblies and substrate supports incorporating capacitor assemblies are provided herein. Embodiments of the inventive capacitor assembly may advantageously prevent direct current (DC) from interfering with a radio frequency (RF) power source when both DC and RF power are provided to a common electrode. Embodiments of the inventive capacitor assembly may advantageously be easily retrofitted to existing substrate supports, thereby avoiding unnecessary and potentially costly modification of the existing substrate supports.

Figure 1:
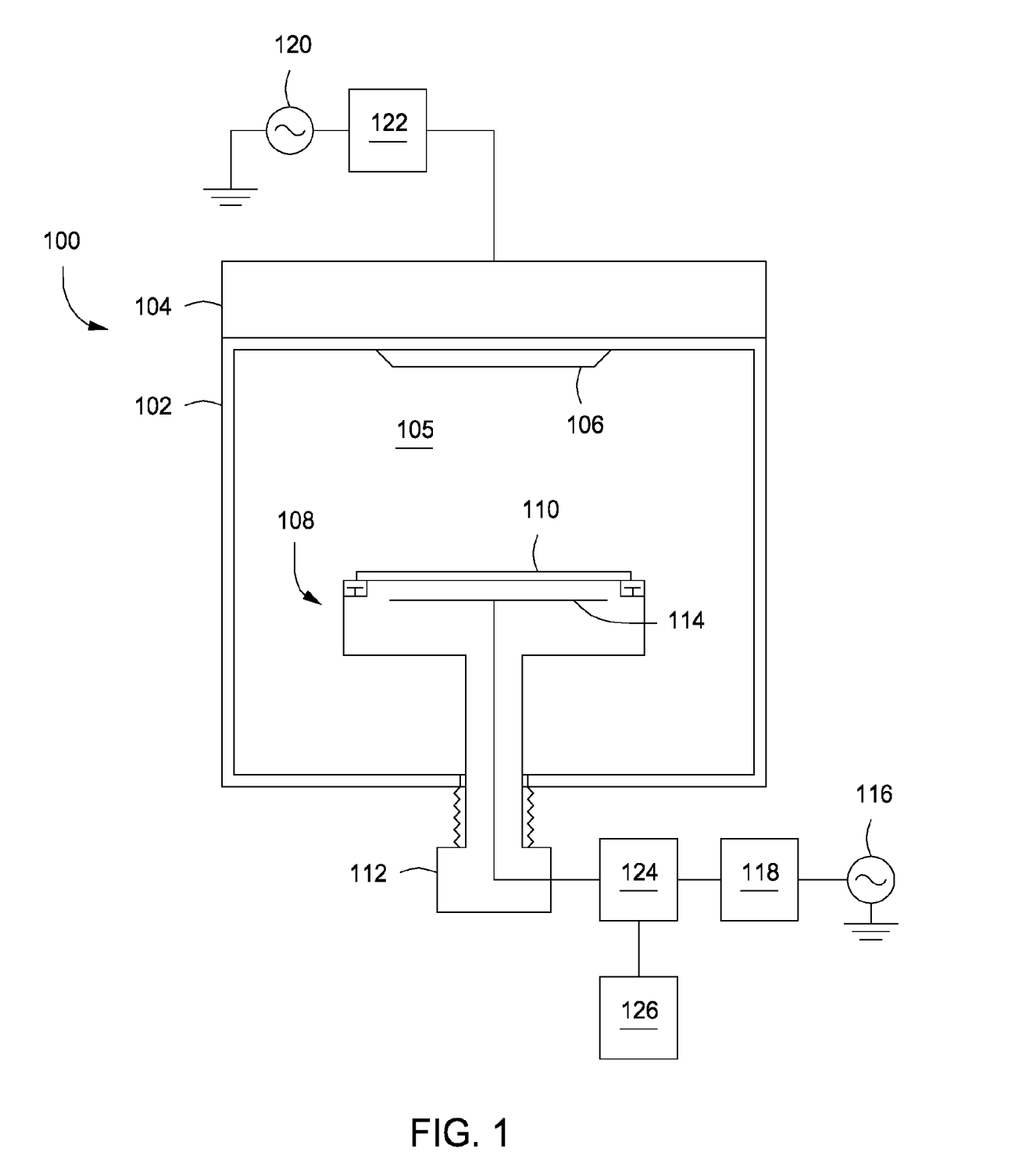
FIG. 1 depicts a simplified schematic view of a process chamber suitable for use with the inventive capacitor assembly in accordance with some embodiments of the present disclosure.

FIG. 1 depicts a simplified schematic side view of an illustrative substrate processing chamber suitable for use with capacitor assemblies in accordance with embodiments of the present disclosure. The process chamber 100 may be any type of process chamber suitable to process substrates, for example, such as a physical vapor deposition (PVD) chamber, an atomic layer deposition (ALD) chamber, a chemical vapor deposition (CVD) chamber, or the like. Exemplary process chambers may include process chambers available from Applied Materials, Inc. of Santa Clara, Calif., as well as process chambers available from other manufacturers.

As described in FIG. 1, the process chamber 100 may comprise a chamber body 102, a lid assembly 104 including a target 106 (or showerhead) secured to the lid assembly 104, and a substrate support 108 for retaining a substrate 110 in a position opposite the target 106. Although FIG. 1 depicts a target 106, it should be noted that this element may alternatively represent a showerhead or other processing component depending upon the chamber configuration and that the inventive capacitor assembly may generally be used in any process chamber where RF and DC energy is provided to a common electrode.

The process chamber 100 has an inner volume that includes a processing volume 105. The processing volume 105 may be defined, for example, between the substrate support 108 and the target 106 (or showerhead or lid of the chamber). The substrate support 108 includes an electrostatic chuck to retain the substrate 110 on the substrate support. Suitable substrates 110 include round substrates, such as 200 mm, 300 mm, 450 mm, or other diameter semiconductor wafers, or rectangular substrates, such as glass panels or the like.

The substrate support 108 includes an electrode 114 that is coupled to one or more RF power sources and a DC power source. Thus, the electrode 114 is both an RF bias electrode and a chucking electrode. The electrode 114 is coupled to one or more RF power sources (one RF power source 116 shown) through one or more respective matching networks (matching network 118 shown). The RF power source 116 may provide either continuous or pulsed power at a frequency suitable for use in the process chamber, for example, dependent upon chamber configuration, substrate composition, and particular processes to be performed. RF power may be provided at a suitable magnitude for the process being performed.

The electrode 114 is further coupled to a DC power source 126 to supply DC power to the electrode 114. The DC power source 126 may be any suitable DC power source as used to provide sufficient energy for the desired application, for example, to electrostatically clamp a substrate to the substrate support.

A capacitor assembly 124 is provided between the RF power source 116 and the electrode 114. If a matching network 118 is present, the capacitor assembly 124 is disposed between the matching network 118 and the electrode 114 as well. The DC power source 126 is coupled to the electrode 114 at a junction between the capacitor assembly 124 and the electrode 114. Although the following description is made with regard to an electrostatic chuck, the capacitor assembly 124 may be used in any application in which DC voltage needs to be blocked and RF is connected or matched.

In some embodiments, the substrate support 108 may be coupled to a lift mechanism 112 to control the position of the substrate support 108. The lift mechanism 112 may move the substrate support 108 between a lower position (as shown) suitable for transferring substrates into and out of the chamber and an upper position suitable for processing.

In some embodiments, one or more RF power sources (one RF power source 120 shown) may be coupled to the process chamber 100 to supply RF power to the target 106. For example, the RF power source 120 may be coupled to a lid assembly 104 of the process chamber 100 via one or more respective match networks (one match network 122 shown).

Figure 2:
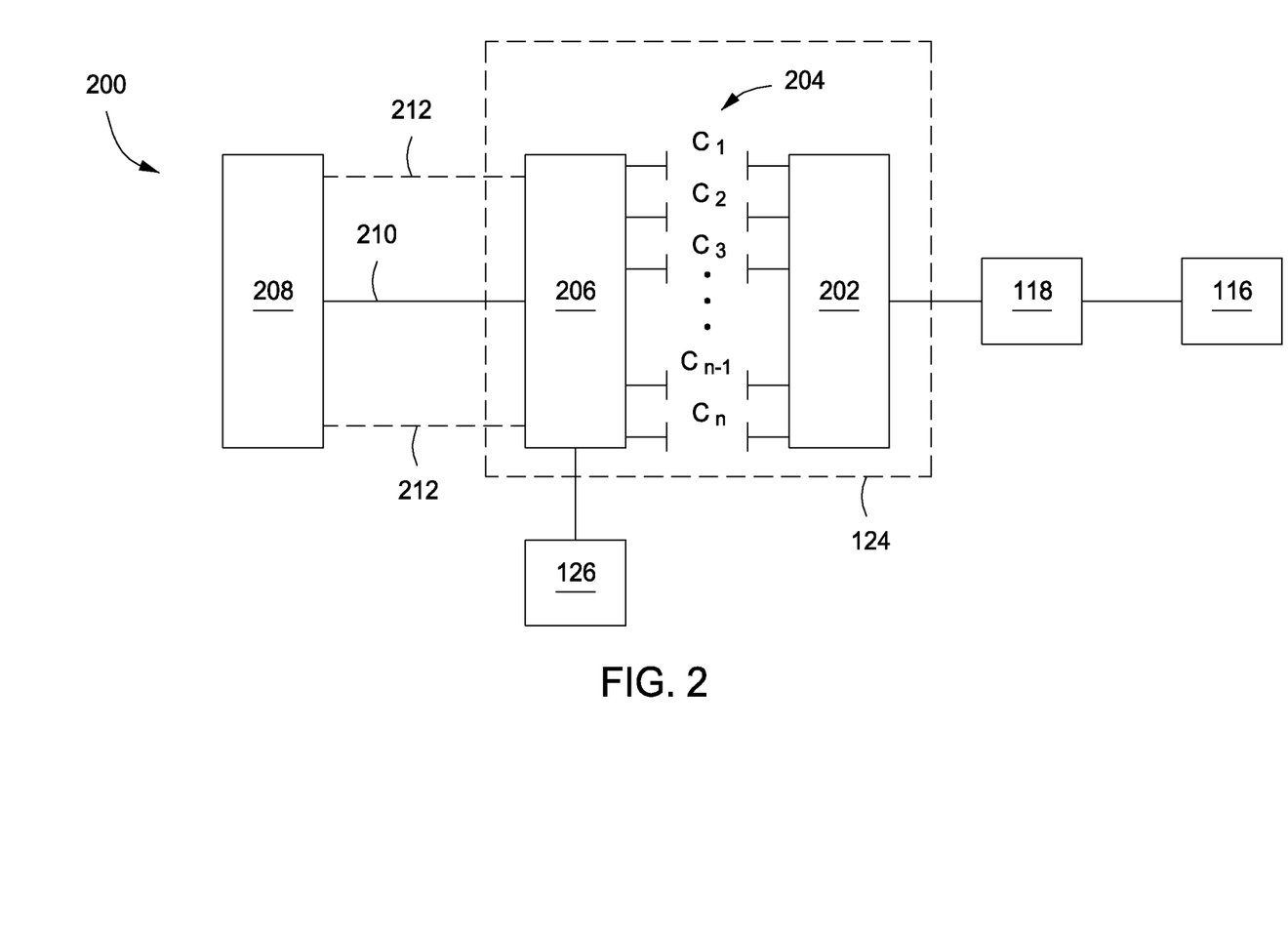
FIG. 2 depicts a schematic of a capacitor assembly in accordance with some embodiments of the present disclosure.

FIG. 2 depicts a schematic diagram of a capacitor assembly 200 in accordance with some embodiments of the present disclosure. The capacitor assembly 200 may be used as the capacitor assembly 124 discussed above with respect to FIG. 1. The capacitor assembly 200 includes a first conductive plate 202, a second conductive plate 206, and a plurality of capacitors 204 disposed and electrically coupled between the first conductive plate 202 and the second conductive plate 206. The plurality of capacitors 204 may be electrically coupled the each of the first and second conductive plates in any suitable manner, such as by soldering, brazing, or the like.

Figure 3:
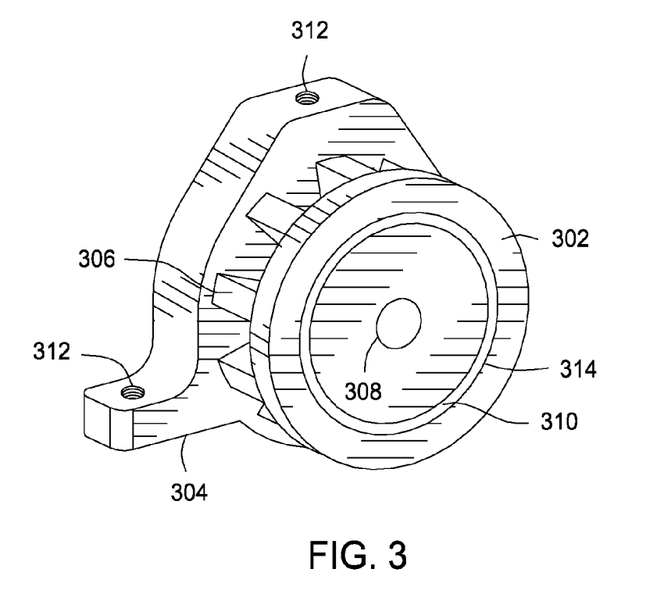
FIG. 3 depicts an isometric view of a capacitor assembly in accordance with some embodiments of the present disclosure.
Figure 3A:
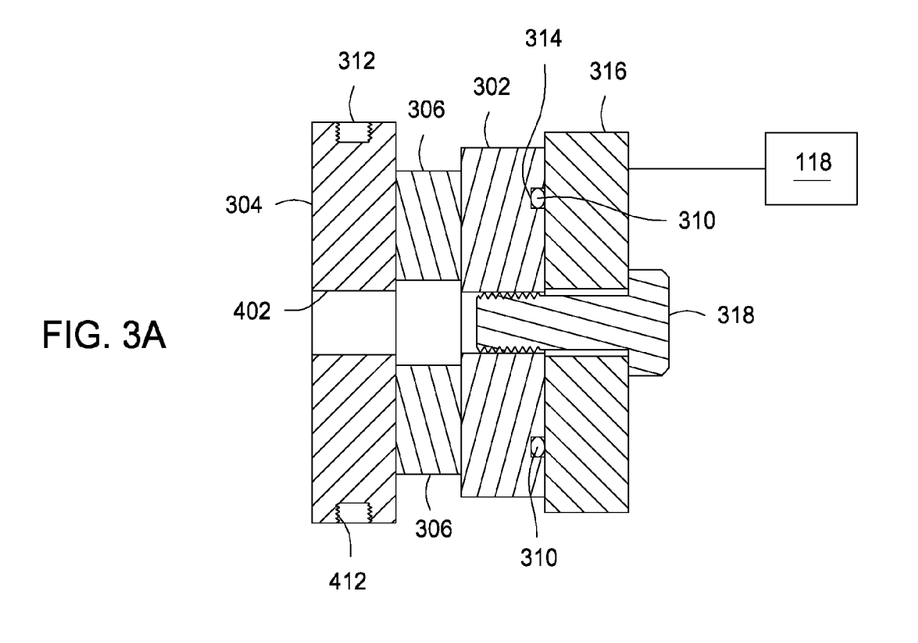
FIG. 3A depicts a side cross-sectional view of a capacitor assembly in accordance with some embodiments of the present disclosure.
Figure 4:
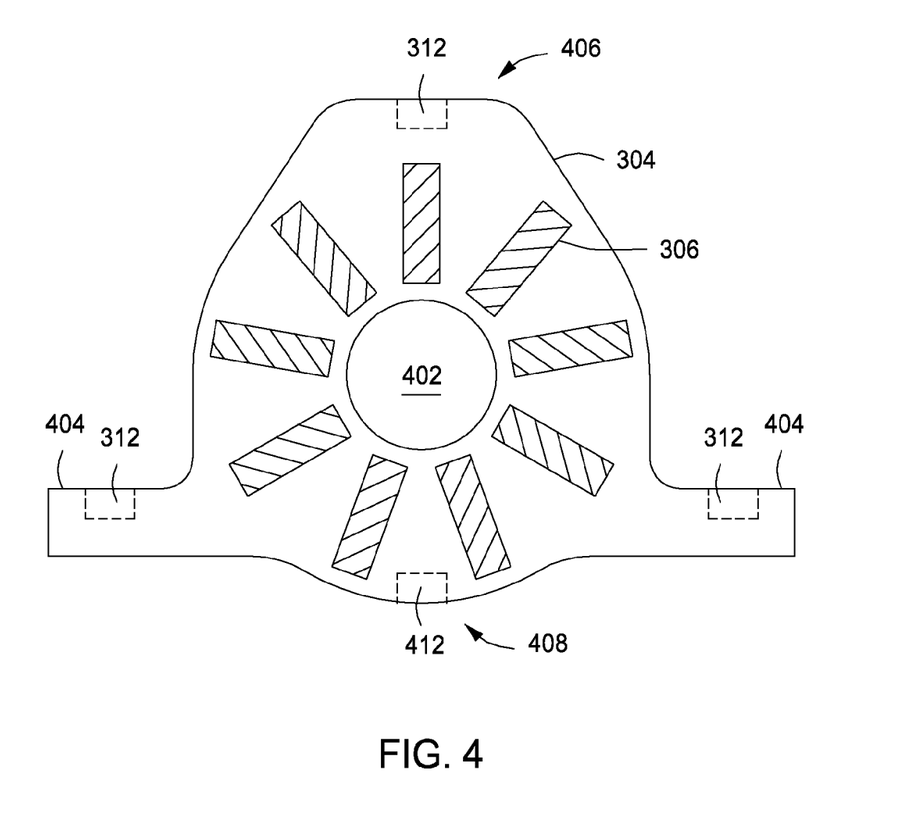
FIG. 4 depicts a side cross-sectional view of a capacitor assembly in accordance with some embodiments of the present disclosure.

The plurality of capacitors 204 are arranged in a circular array (as shown in an illustrative example in FIGS. 3-4). In some embodiments, the plurality of capacitors 204 are arranged in a circular array axisymetrically with respect to a central axis of the circular array (as shown in the illustrative example of FIGS. 3-4). In some embodiments, about 9 capacitors are provided in the circular array. However, the number of capacitors is only limited by the size of the capacitor assembly 200 and that any number of capacitors (i.e., one or more) may alternatively be used. Each of the plurality of capacitors 204 has substantially the same capacitance. The plurality of capacitors 204 may generally include any number of capacitors in any size depending on the frequency of the RF power and physical space limitations.

The first conductive plate 202 is coupled to the RF power source 116 (via the matching network 118, when present) to receive RF power from the RF power source 116. The second conductive plate 206 is electrically coupled to a load 208, for example via conductor 210. For example, the load 208 may be the electrode 114, described above with respect to FIG. 1. In some embodiments, the second conductive plate 206 may be coupled to the load 208 at a plurality of locations, for example using additional conductors 212. In some embodiments, the conductor 210 and the additional conductors are substantially evenly spaced apart from each other to advantageously receive and distribute an approximately equal portion of the RF power provided by the RF power source 116 to the load 208.

The DC power source 126 is also coupled to the load 208 at one or more locations. In some embodiments, the DC power source 126 is coupled to the second conductive plate 206 to receive DC power from the DC power source 126 such that the DC power source 126 is coupled to the load 208 via the conductor 210 and, if present, any additional conductors 212. In some embodiments, the DC power source 126 may be coupled to the load 208 via the additional conductors 212 or a separate conductor (not shown) coupling the DC power source 126 directly or indirectly to the load 208.

In operation, RF energy is provided by the RF power source 116 to the first conductive plate 202. The RF energy travels across the plurality of capacitors 204 to the second conductive plate 206. The radial arrangement of the plurality of capacitors advantageously provides more even distribution of RF power to each portion of the load as compared to conventional rectangular arrays, which have shown unsatisfactory distribution. The RF energy is coupled to the load 208 by the conductor 210 and any additional conductors 212. DC power is coupled to the load 208 by the conductor 210 (and any additional conductors 212), or via a separate conductor (not shown). In some embodiments, the DC power source 126 is coupled to the second conductive plate 206 and the DC power is coupled to the load 208 via the conductor 210 and any additional conductors 212.

FIG. 3 depicts an isometric view of an illustrative capacitor assembly 300 in accordance with some embodiments of the present disclosure. The capacitor assembly 300 is illustrative of a particular configuration of the capacitor assembly 200 and is not meant to be limiting of the scope of the disclosure. The capacitor assembly 300 includes a first conductive plate 302 and a second conductive plate 304. A plurality of capacitors 306 are disposed between and electrically couple the first and second conductive plates 302, 304. The first and second conductive plates 302, 304 may be formed of any suitable conductive material. In some embodiments, the first and second conductive plates 302, 304 may be coated with a material having a resistance to tarnishing or oxidation, such as silver, gold, or other metals whose impedance is not adversely affected by tarnishing. For example, in some embodiments, the first and second conductive plates 302, 304 are formed from copper and have a coating of silver.

As illustrated in FIG. 3, the first conductive plate 302 may be circular or have some other symmetrical shape to promote a substantially uniform flow of RF energy to each of the plurality of capacitors 306. The first conductive plate 302 includes a feature for coupling the RF energy to the first conductive plate 302, such as a bore 308. In some embodiments, the feature may be centrally located in or on the first conductive plate 302. For example, as depicted in FIG. 3, the bore 308 is centered on the first conductive plate 302. In some embodiments, the bore 308 may be threaded to receive a correspondingly threaded bolt.

A conductor coupled to the RF power source 116, such as an output from matching network 118, is coupled to the first conductive plate 302. For example, in some embodiments, a conductor may be bolted to the first conductive plate 302 via the bore 308. FIG. 3A depicts a side cross sectional view of the capacitor assembly 300 in accordance with some embodiments of the present disclosure. In some embodiments, and as depicted in FIG. 3A, a third conductive plate 316 may be coupled to an output from the matching network 118. The third conductive plate 316 may be coupled to the first conductive plate 302, for example using a bolt 318 threaded into the bore 308 of the first conductive plate 302. In some embodiments, the first conductive plate 302 may further comprise a groove 314 to receive an RF gasket 310 to enhance surface contact between the surface of the third conductive plate 316 and the facing surface of the first conductive plate 302, thereby promoting enhanced flow of RF current to the first conductive plate 302. The RF gasket 310 may be formed of any conductive material with a metal coating whose impedance is not adversely affected by tarnishing. In some embodiments, the RF gasket 310 is formed of silver-plated copper.

Returning to FIG. 3, the plurality of capacitors 306 may individually be any conventional capacitors suitable for the application, such as, for example, porcelain style ceramic capacitors, although other types of capacitors may also be used. In some embodiments, the plurality of capacitors are radially arranged about the bore 308 to ensure uniform delivery of RF power to the second conductive plate 304. The radial arrangement of the plurality of capacitors 306 further advantageously avoids areas of high temperature in the capacitor assembly 300 and reduces the overall size of the capacitor assembly 300. The size of the capacitors 306 are chosen to ensure a distance between the first and second conductive plates 302, 304 large enough to avoid arcing and ensure sufficient voltage isolation. In some embodiments, a tubular capacitor with the desired capacitance may alternatively be used instead of the plurality of capacitors 306.

The following description of the second conductive plate 304 is made with reference to FIGS. 3 and 4. FIG. 4 depicts a side cross-sectional view of the capacitor assembly 300 showing the plurality of capacitors 306. In some embodiments, the second conductive plate 304 may include a bore 402. The bore 402 may be centered in the second conductive plate 304. In some embodiments, the second conductive plate 304 may include a pair of flanges 404. The flanges 404 may be disposed on generally opposing sides of the second conductive plate 304 proximate a first end 408 of the second conductive plate 304.

An input tap 412 may be provided in the second conductive plate 304. In some embodiments, the input tap 412 is formed in the first end 408 of the second conductive plate 304. In some embodiments, the input tap 412 is formed proximate the center of the first end 408. The input tap 412 may be coupled to a DC power source (e.g., DC power source 126) to receive DC power.

The second conductive plate 304 includes one or more output taps 312 to deliver power to the load (e.g., load 208 described above with respect to FIG. 2). In embodiments where a plurality of output taps 312 are provided, the output taps 312 may be equidistantly spaced from each other. In embodiments where a plurality of output taps 312 are provided, the output taps 312 may be axisymetrically arranged on the second conductive plate 304. The axis of symmetry of the output taps 312 may be the same as the axis of symmetry of the plurality of capacitors 306. In some embodiments, an output tap 312 is formed in each of the flanges 404 and in a second end 406 of the second conductive plate 304 opposite the first end 408.

The one or more output taps 312 may be electrically coupled to the load (e.g., the electrode 114). A symmetric arrangement of the output taps 312 about the second conductive plate 304 promotes a more uniform delivery of DC and RF power to the load. However, the output taps 312 may be formed anywhere on the second conductive plate 304. Each output tap 312 may be associated with a different load (e.g., a different electrode) or the same load (e.g., the same electrode). In some embodiments, a filter board (not shown) may be disposed between the second conductive plate 304 and the DC power source 126 to prevent RF energy from travelling to the DC power source 126.

FIG. 4 illustratively depicts nine capacitors. However, any number of capacitors may be used to deliver the desired amount of power to the load. For example, the diameter of the first and second conductive plates 302, 304 may be larger (or smaller) to accommodate more (or fewer) capacitors to meet higher (or lower) power requirements. Alternatively or in combination, capacitors with different values may be used to meet specific frequency requirements.

Figure 5:
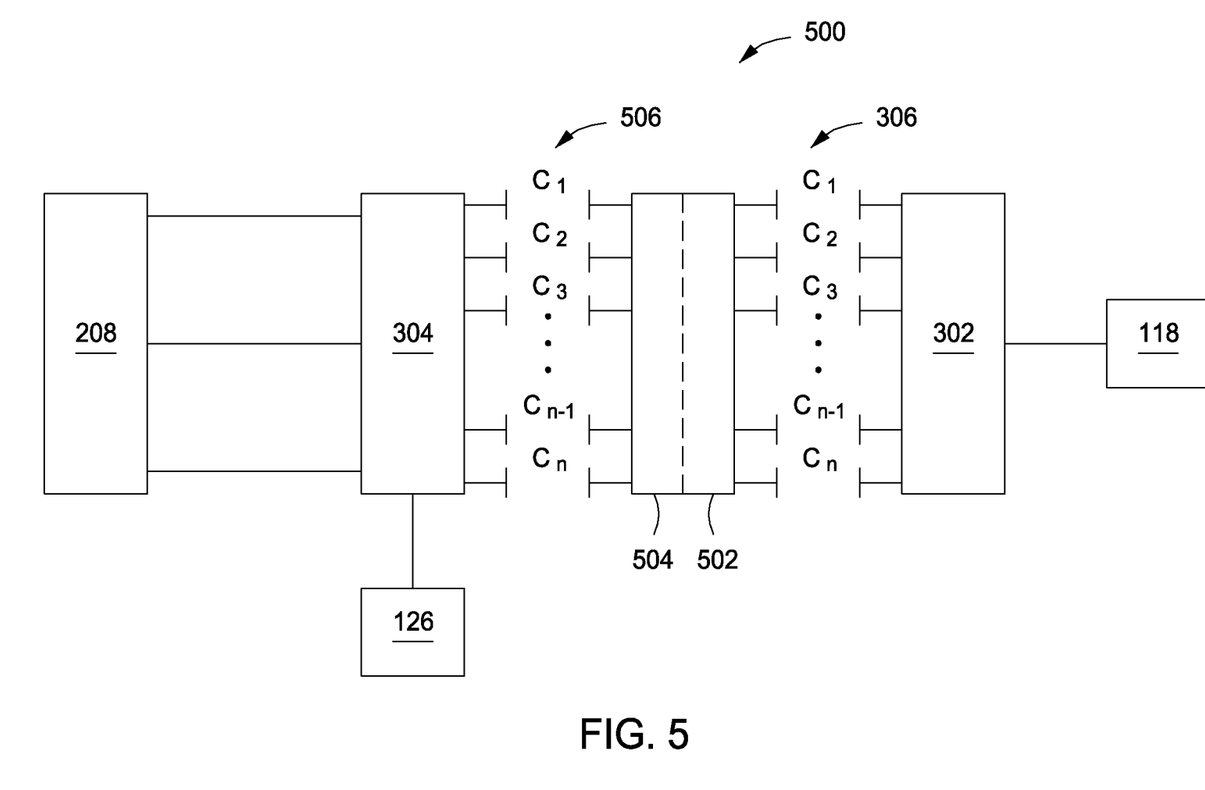
FIG. 5 depicts a schematic of a capacitor assembly in accordance with some embodiments of the present disclosure.

FIG. 5 depicts a schematic view of a capacitor assembly 500 in accordance with some embodiments of the present disclosure. In some embodiments, two or more capacitor assemblies, similar to capacitor assembly 200 or 300 as described above, may be stacked to increase the amount of power that can be handled by the assembly. In a stacked configuration, an intermediate conductive plate 502 (similar to the first conductive plate 302) is coupled to the first conductive plate 302 by a first plurality of capacitors 306 and coupled to the second conductive plate 304 by a second plurality of capacitors 506. In some embodiments, the intermediate conductive plate 502 may be directly coupled to a second intermediate conductive plate 504 (as depicted in phantom) and the second intermediate conductive plate 504 is coupled to the second conductive plate 304 by the second plurality of capacitors 506. Providing the second intermediate conductive plate 504 advantageously facilitates ease of construction and modularity of assembly.

Such a configuration would be desirable, for example, if the amount of voltage necessary to provide to the load (e.g., the electrode 114) is very large. In this case, the distance between the second conductive plate 304, which receives DC power, and the first conductive plate 302, which receives RF power from the matching network 118, must be large enough to isolate the RF power from the DC current. Therefore, stacking the capacitor assemblies 300 would achieve the necessary voltage isolation. Alternatively, a longer capacitor or stacked capacitors may be used to increase the distance between the first conductive plate 302 and the second conductive plate 304.

While the foregoing is directed to embodiments of the present disclosure, other and further embodiments may be devised without departing from the basic scope thereof.

The invention claimed is:

1. A capacitor assembly for coupling radio frequency (RF) and direct current (DC) power to an electrode, comprising:
 a first conductive plate to receive RF power from an RF power source, the first conductive plate including a central bore;
 at least one capacitor coupled to the first conductive plate and surrounding the central bore; and
 a second conductive plate electrically coupled to the first conductive plate via the at least one capacitor, the second conductive plate including a second input tap to receive DC power from a DC power source and at least one output tap to couple the RF and DC power to an electrode.

2. The capacitor assembly of claim 1, wherein the first conductive plate is circular.

3. The capacitor assembly of claim 1, wherein the at least one capacitor is a tubular capacitor.

4. The capacitor assembly of claim 1, wherein the at least one capacitor is a plurality of capacitors radially disposed about the central bore.

5. The capacitor assembly of claim 4, further comprising:
 an intermediate conductive plate; and
 a second plurality of capacitors coupled to the intermediate conductive plate,
 wherein the plurality of capacitors is disposed between the first conductive plate and the intermediate conductive plate, and
 wherein the second plurality of capacitors is disposed between the intermediate conductive plate and the second conductive plate.

6. The capacitor assembly of claim 1, further comprising:
 a third conductive plate to couple the RF power to the first conductive plate;
 wherein the central bore of the first conductive plate is threaded to receive a correspondingly threaded bolt to couple the third conductive plate to the first conductive plate.

7. The capacitor assembly of claim 6, wherein the first conductive plate comprises a groove containing a gasket to increase surface contact between the third conductive plate and the first conductive plate.

8. The capacitor assembly of claim 1, wherein the electrode is disposed in a substrate support.

9. The capacitor assembly of claim 1, wherein the at least one output tap comprises a plurality of output taps.

10. The capacitor assembly of claim 9, wherein each of the plurality of output taps is coupled to a respective electrode.

11. A capacitor assembly for coupling radio frequency (RF) and direct current (DC) power to an electrode, comprising:
 a circular conductive plate to receive RF power from an RF power source, the circular conductive plate including a central bore;
 a plurality of capacitors coupled to the circular conductive plate and radially disposed about the central bore; and
 a second conductive plate electrically coupled to the circular conductive plate via the plurality of capacitors, the second conductive plate including an input tap to receive DC power from a DC power source and at least one output tap to couple the RF and DC power to an electrode.

12. The capacitor assembly of claim 11, further comprising:
 an intermediate conductive plate; and
 a second plurality of capacitors coupled to the intermediate conductive plate,
 wherein the plurality of capacitors is disposed between the circular conductive plate and the intermediate conductive plate, and
 wherein the second plurality of capacitors is disposed between the intermediate conductive plate and the second conductive plate.

13. The capacitor assembly of claim 11, further comprising:
 a third conductive plate to couple the RF power to the circular conductive plate;
 wherein the central bore of the circular conductive plate is threaded to receive a correspondingly threaded bolt to couple the third conductive plate to the circular conductive plate.

14. The capacitor assembly of claim 13, wherein the circular conductive plate comprises a groove containing a gasket to increase surface contact between the third conductive plate and the circular conductive plate.

15. The capacitor assembly of claim 11, wherein the electrode is disposed in a substrate support.

16. The capacitor assembly of claim 11, wherein the at least one output tap comprises a plurality of output taps.

17. The capacitor assembly of claim 16, wherein each of the plurality of output taps is coupled to a respective electrode.

18. A substrate support assembly, comprising:
 a substrate support including at least one chucking electrode;
 a direct current (DC) power source;
 a radio frequency (RF) power source; and
 at least one capacitor assembly electrically coupled to the at least one chucking electrode, the at least one capacitor assembly comprising:
  a first conductive plate to receive RF power from an RF power source, the first conductive plate including a central bore;
  at least one capacitor coupled to the first conductive plate and surrounding the central bore; and
  a second conductive plate electrically coupled to the first conductive plate via the at least one capacitor, the second conductive plate including a second input tap to receive DC power from a DC power source and at least one output tap to couple the RF and DC power to an electrode.

19. The substrate support assembly of claim 18, further comprising:

an RF matching network disposed between the capacitor assembly and the RF power source.

20. The substrate support assembly of claim 18, wherein the substrate support assembly is an electrostatic chuck.

* * * * *